Figure 1:
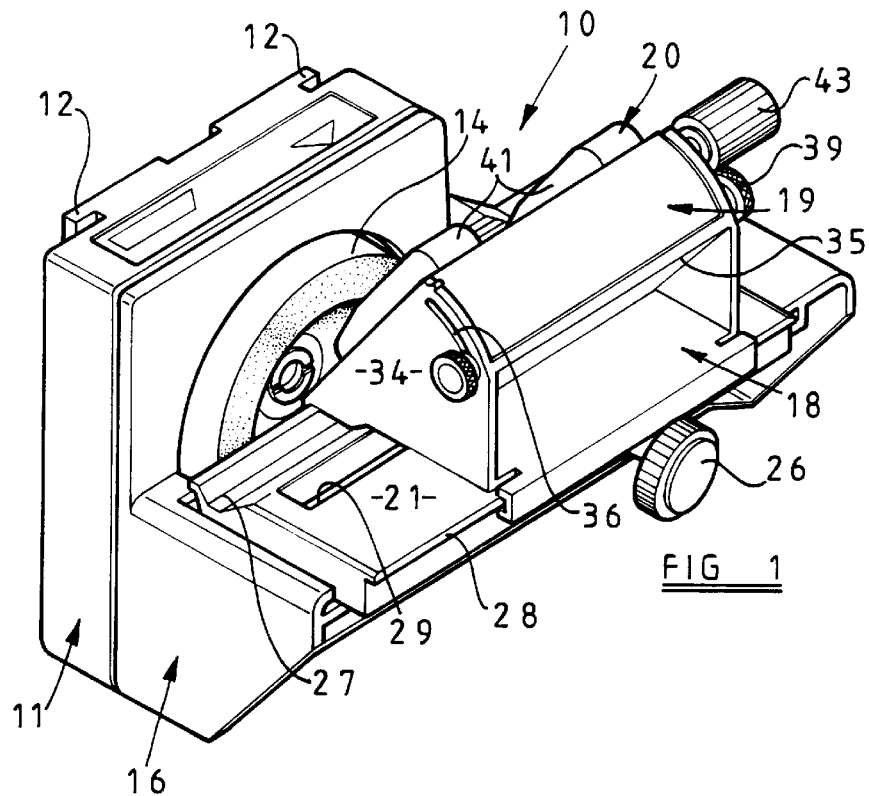

United States Patent [19]
Hepworth

[11] Patent Number: 5,810,646
[45] Date of Patent: Sep. 22, 1998

[54] MEANS FOR PRODUCING RELATIVE RECIPROCATORY MOVEMENT BETWEEN TWO MEMBERS

[75] Inventor: Paul Steabben Hepworth, Guildford, Great Britain

[73] Assignee: Turner Intellectual Property Limited, Great Britain

[21] Appl. No.: 663,170

[22] PCT Filed: Dec. 14, 1994

[86] PCT No.: PCT/GB94/02733

§ 371 Date: Aug. 26, 1996

§ 102(e) Date: Aug. 26, 1996

[87] PCT Pub. No.: WO95/16545

PCT Pub. Date: Jun. 22, 1995

[30] Foreign Application Priority Data

Dec. 18, 1993 [GB] United Kingdom .................... 9325923

[51] Int. Cl.[6] ...................................... B24B 3/36
[52] U.S. Cl. .......................... 451/273; 451/293; 451/377; 74/30
[58] Field of Search .................................. 451/273, 293, 451/377, 393; 74/30

[56] References Cited

U.S. PATENT DOCUMENTS

| 25,465 | 9/1859 | Broughton | 451/393 |
|---|---|---|---|
| 1,354,237 | 9/1920 | Boyd | 74/30 |
| 1,591,473 | 7/1926 | De Vivo | 451/273 |
| 2,077,689 | 4/1937 | Grobstein | 51/114 |
| 2,821,861 | 2/1958 | Dunn | 74/30 |
| 5,191,737 | 3/1993 | Snoddy | 51/218 R |

FOREIGN PATENT DOCUMENTS

| 173293 | 12/1952 | Austria | 451/273 |
|---|---|---|---|
| 0 286 266 | 10/1988 | European Pat. Off. | B24B 3/36 |
| 404778 | 12/1909 | France | 451/273 |
| 1262473 | 2/1972 | United Kingdom | B23Q 27/00 |
| WO 90/13396 | 11/1990 | WIPO | B24B 41/06 |

*Primary Examiner*—Robert A. Rose
*Attorney, Agent, or Firm*—Thomason and Moser

[57] ABSTRACT

Means for producing reciprocatory movement of a vice carrier (18) across a guideway (17) mounted on a body moulding (11, 16), which partly shrouds a rotatably driven grinding wheel (14), comprise a rack moulding (57) having upper and lower racks (61, 62) which are alternately engaged by a pinion (44) driven from the grinding wheel drive, in use. Rack moulding movement is transmitted to the vice carrier and spring means (67, 68) move the rack moulding to change the pinion engagement from the lower rack to the upper rack and vice versa at the ends of the racks, thereby reversing the rack moulding movement. A guide peg (56) of the body moulding alternately engages in upper and lower slots (65a, 65b) of the rack moulding to maintain the pinion in engagement with its appropriate associated rack while it is between the ends thereof. The arrangement is intended for use as part of a releasable adapter for a powered grinding tool incorporating said grinding wheel.

17 Claims, 3 Drawing Sheets

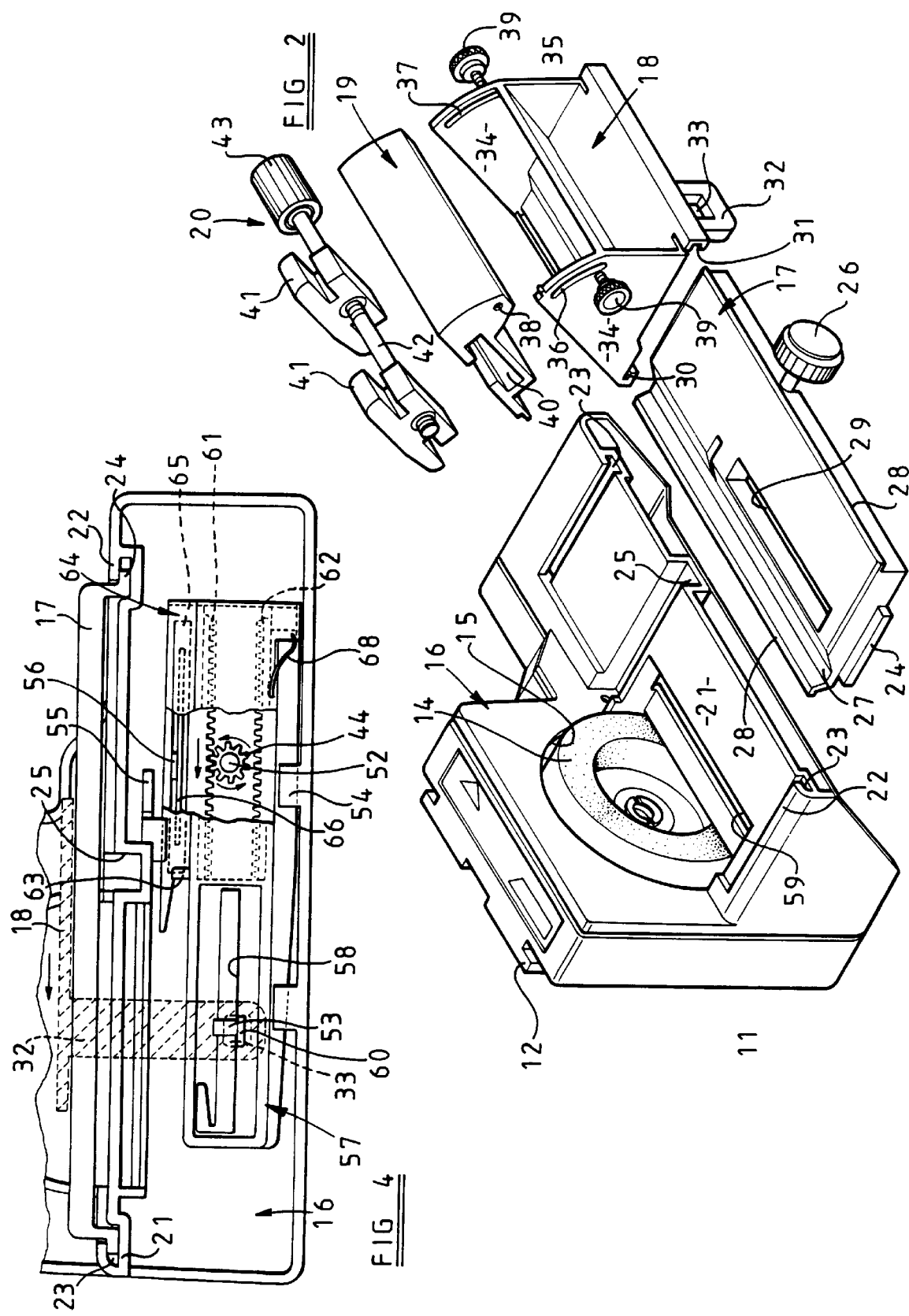

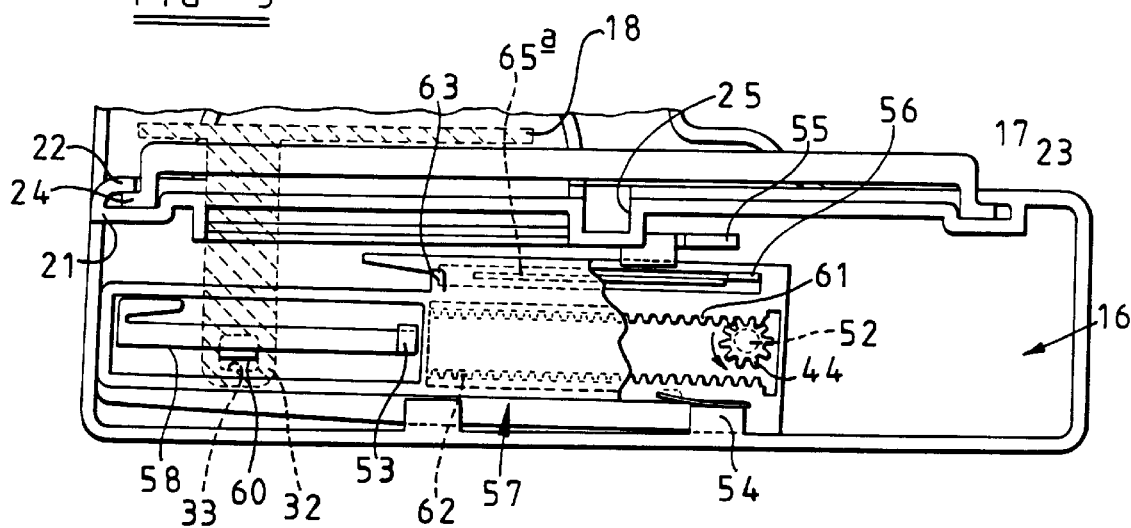
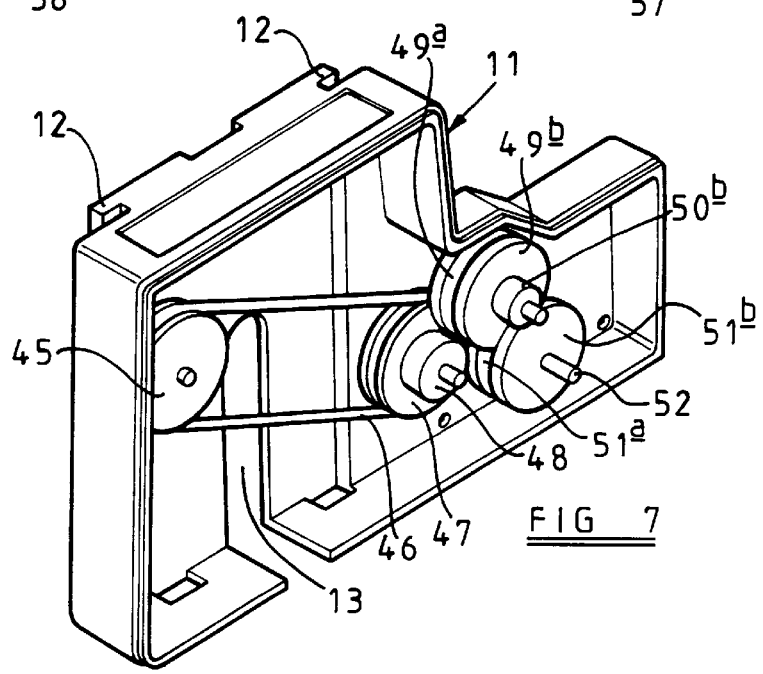

5,810,646

MEANS FOR PRODUCING RELATIVE RECIPROCATORY MOVEMENT BETWEEN TWO MEMBERS

This invention relates to means for producing relative reciprocatory movement between two members, and is particularly applicable to the movement of the a blade holder from side to side across a grinding wheel in order to sharpen a blade carried by the holder, in use.

In our U.K. Patent Application No. 9300687.2 (2263424A) a grinding tool is disclosed to which a selected one of a number of adapters, each intended to carry a particular implement to be sharpened in use, can be fitted to carry out the sharpening operation. To effect correct sharpening, it is necessary with some of the adapters to move a part thereof manually from side to side across the grinding wheel of the tool, which is driven by an electric motor. Clearly it would be desirable for any such required manual movement to be motorised.

An object of the invention is to provide means for producing relative reciprocatory movement between two members in an effective and convenient manner.

According to the invention means for producing relative reciprocatory movement between two members comprises rotary drive means associated with one of said members, the other of the members being drivable through engagement means for receiving drive from said drive means, one part of the engagement means being such that when it receives said drive it causes the other of said members to move in one direction, another part of the engagement means being such that when it receives said drive it causes the other of said members to move in the opposite direction, the change in the reception of drive from said one part of the engagement means to the other occurring automatically, in use, and the direction of rotation of the drive means being the same when transmitting drive to either said one or said another part of the engagement means.

Preferably the engagement means comprises two parallel, spaced facing racks, the two racks constituting said one part and said another part respectively of the engagement means. More preferably the automatic change in the reception of drive from one rack to the other is effected by resilient means.

Conveniently the resilient means comprises two springs which effect said automatic change when the drive means is at opposite ends of the racks respectively.

Desirably when the drive means is engaged with a rack at a position between the ends thereof, the engagement with the rack is maintained by means of part of said one member travelling in either an upper or lower part of a guide slot associated with the other of the members.

Advantageously the automatic transfer of drive from one rack to the other is effected by the springs effecting relative movement between said part of said one member and said guide slot, at the end of the rack, so that the part can alternately be received in the upper and lower parts of the guide slot, thereby maintaining either the upper rack or the lower rack in engagement with the drive means.

The invention will now be described, by way of example, with reference to the accompanying drawings, in which:

FIG. 1 is a perspective view of a grinding tool adapter incorporating the means of the present invention, for driving a blade carrier from side to side across a grinding wheel of a grinding tool to which the adapter is intended to be fitted, in use, the grinding wheel being shown for reference, FIG. 2 is an exploded perspective view of the various components of the adapter of FIG. 1, with a body of the adapter being shown in place on the grinding wheel of said grinding tool, FIGS. 3 to 6 respectively diagrammatically show how relative reciprocable movement is accomplished between the blade carrier and the adapter body of FIGS. 1 and 2, and FIG. 7 is a diagrammatic perspective view of part of the adapter body showing a gear train arrangement for taking drive from the grinding wheel shaft to a drive element to effect said reciprocation.

Although the present invention relates generally to means for producing relative reciprocatory movement between two members, it has a particular application, and will thus be described, in relation to an adapter of the kind described, illustrated and claimed in our co-pending UK Patent Application No. 9300687.2 (2263424A) and described and illustrated in our later Patent Application No. 9404243.9. Both of these patent applications are concerned with the use of a powered grinding tool to which various selected adapters can be releasably fitted, in use, so as to provide correct locations for implement blades carried by the adapters to be sharpened by a grinding wheel of the grinding tool. Although in the later patent application described above, there is described an alternative means of releasably fitting an adapter to the grinding tool, the present application relates to an adapter which can have either form of releasable fixing means and can thus be used with either form of grinding tool, as well as having suitable alternative releasable fixing means if required. In addition the means of the present invention could be incorporated in an arrangement which is fixed to a grinding tool, rather than being incorporated in a releasable adaptor. However in an alternative form of such a grinder, it may well be possible to alter the form of the member which is reciprocally driven across the front of the grinding wheel, in that it may be possible for different forms of blade carrier to be used.

However in its broadest form, as mentioned above, the present invention provides a convenient and effective means of producing reciprocatory movement between two members and thus clearly has wider application than its described uses for moving a tool carrier across the face of a grinding wheel or the like.

FIGS. 1 and 2 show an adaptor 10, as described above for use with a grinding tool of either of our above mentioned patent applications. To this end a rear body moulding 11 of the adapter is provided with spaced rear upper ears for slidable releasable engagement with respective complementary parts of the grinding tool. From FIG. 7 is can be seen that this rear body moulding 11 has a elongated slot 13 in its rear face and lower wall to allow reception of a drive spindle of the grinding tool when the adapter is fitted to this tool, in use. The spindle passes through this slot and carries a grinding wheel 14, as shown in FIGS. 1 and 2, the wheel extending somewhat through an opening 15 in a rear part of a front body moulding 16 which is fitted to the rear body moulding 11 in normal assembly so as to conceal in the rear body moulding the gear train which is shown in FIG. 7 and which will be described hereinafter.

As can be seen in FIGS. 1 and 2, the adapter includes not only the body moulding, made up of the front and rear parts described, but also a guideway 17, a vice carrier 18, a tiltable vice 19 and a vice jaw assembly 20, all of which can be plastics material mouldings.

The front body moulding 16 has a forwardly extending platform 21, and this platform is formed with parallel spaced facing transverse lips 22 defining guideways 23 therebelow to receive complementarily shaped guides 24 projecting from opposite shorter sides respectively of the guideway 17.

Between the lips 22 and associated guideways 23, the platform 21 has, at one side of the grinding wheel, a channel 25 in which is received an adjustment screw 26 which is engaged with a feed screw nut of the guideway 17. At its free end the screw 26 is held by a circlip to the front body moulding 16, so that if the adjustment screw is turned, this causes the guideway 17 to move towards or away from the grinding wheel 14 along the guideways 23 by movement along the screw of the feed screw nut. Thus as will be described, this adjustment moves the blade to be sharpened into or out of engagement with the grinding wheel.

The guideway 17 has, in its upper surface, a straight elongated channel 27 adjacent its longer side remote from the adjustment screw 26. The two opposite longer sides of the guideway are formed as ribs 28. Behind the channel 27 and at one side of screw 26, the guideway is provided with a rectangular slot 29, the length of this slot being substantially equal to the diameter of the grinding wheel, with which this slot is substantially aligned, as shown in FIG. 1.

Slidably engaged for reciprocatory movement on the guideway 17 is the vice carrier 18. This has slots 30, 31 respectively formed at the underside of its front and rear longer sides, and this carrier 18 can slide on the guideway 17 with the ribs 28 of the guideway engaging in the slots 30, 31, this engagement being sufficiently tight to prevent any transverse movement of the carrier on the guideway. Depending from its underside, the carrier has a driving arm 32 in the form of a rectangular finger having a generally square opening 33 therethrough adjacent its lower end. The carrier is engaged on the guideway 17 so that this driving arm 32 extends through the slot 29, thereby limiting the degree of reciprocatory movement possible between the carrier and the body moulding, and thus between the carrier and the grinding wheel. The carrier is assembled to the guideway on platform 21 by positioning the arm 32 just into the slot 29, tipping the carrier forwards to engage rib 28 in slot 30, and then lowering the rear of the carrier to snap-fit the other rib 28 into slot 31. The arm then passes through the slot 29 and the aligned slot in the platform 21, to be described.

The vice carrier has a pair of sector-shaped, parallel side walls 34, and connecting these together is a support wall 35 which is angled rearwardly away from the front edge of the blade carrier. The side walls are provided with respective, aligned arcuate slots 36, 37 adjacent their outer peripheries, these slots being to allow tiltable adjustment of the vice 19 which is generally received between the side walls 34 at the front of the support wall 35. The upper part of the vice 19 is formed, by the use of metal inserts, with respective threaded apertures 38 at the upper rear thereof, and knurled adjustment knobs 39 have respective shanks which pass through the slots 36, 37, and into said apertures 38 to secure the vice 19 in a selected chosen tilted position relative to the rear wall 35 of the carrier 18.

The lower front part of the vice 19 is in the form of a lipped channel 40 in which is received a pair of jaws 41 of the vice jaw assembly 20. Each jaw has a rearward projecting part of complementary shape to that of the lipped channel 40 so that it can slide along said channel. The jaws are carried on a shaft 42 which has a knurled adjustment knob 43 at one end. The shaft is fixed relative to the vice and passes through an arcuate slot (not shown) in right hand side wall 34 to permit tilting adjustment of the vice 19. The shaft has a central fixed cirdip washer in a groove (not shown), and is provided at opposite sides thereof respectively with a left hand and a right hand thread so that rotation of the shaft by way of the knob 43 will move the jaws together or apart depending upon the direction of rotation. Thus, as will be described, various widths of blade can be clamped between the two jaws. Alternatively the opposite hand threads can be provided by respective inserts engaged on the shaft and carrying the jaws 41.

Accordingly with this particular embodiment of adaptor, incorporating the reciprocatory movement means of the invention, as will be described, there are two forms of adjustment for a blade clamped in the vice jaw assembly 20. Firstly there is an adjustment by means of the screw 26 to move the whole assembly of carrier, vice and vice jaw assembly towards or away from the grinding wheel, and secondly there is adjustment to tilt the vice itself angularly towards or away from the grinding wheel. As will be described, the carrier together with its vice and vice jaw assembly are, in use, automatically reciprocally driven from side to side across the front of the grinding wheel to produce correct and effective sharpening of the blade.

The actual means for producing said reciprocatory movement will now be described, as applied to the adaptor shown in FIGS. 1 and 2, with reference to FIGS. 3 to 6 in which the blade carrier 18 is shown only schematically.

Firstly however reference is made to FIG. 7 which shows a gear train arrangement of the adapter which is used to transmit drive from the grinding wheel drive shaft to an output pinion 44 (FIGS. 3 to 6) which, although it rotates angularly, is effectively fixed relative to the body moulding, so that, as will be described, as the pinion rotates it drives the carrier 18 across the front of the body moulding, and thus the grinding wheel, by means of the driving arm 32 of the carrier.

As can be seen from FIG. 7, in one arrangement of gear train an idler pulley 45 is mounted on a shaft of the rear body moulding 11 at the left side of the slot 13, as viewed in this figure. In use a take-off pulley on the grinding wheel drive shaft engages with and tensions a spring drive belt 46 to transmit drive by friction to a gear pulley 47 at the opposite side of the slot 13, the belt being around the spaced pulleys 45 and 47. The gear pulley 47 is carried by a further shaft of the rear body moulding 11, and is provided at its forward side with a smaller gear 48 which is in engagement with a larger train gear 49a mounted on a still further shaft of the rear body moulding. This train gear 49a has a smaller gear (not shown) provided at its forward side, and this meshes with a train gear 51a on a shaft 52. The gear 51a itself has a smaller gear (not shown) at its forward side, and this meshes with a larger train gear 49b. The gear 49b is of the same form as gear 49a and is on the same shaft. The gear 49b thus has on its forward side a smaller gear 50b which finally meshes with a further larger output gear 51b fixed on shaft 52, which shaft projects forwardly from the open front of the rear body moulding for attachment thereon of the output pinion 44 once the front body moulding has been fitted, on assembly, to the rear body moulding 11.

Thus by the use of a suitable gear train, drive from the motor of the grinding tool can be transmitted to drive an output pinion which, as will be described, is used to effect reciprocatory movement between the blade carrier and the body moulding in which the grinding wheel is received, in use. However any other suitable form of gear train or reduction gear arrangement could be provided. Clearly when the grinding tool and adaptor are formed as one part, i.e. when the adaptor is in effect fixed to the tool, the drive from the motor will normally of course directly drive both the grinding wheel and the pinion. However it might be possible to provide separate or different means of driving the pinion if in any arrangement this was more desirable than using the drive for the grinding wheel.

Beneath the platform 21 of the front body moulding 16, this moulding is provided with a forwardly projecting lug 53. A larger, rectangular lug 54 upstands integrally from the lower front surface of the front body moulding and spaced generally directly above this, a rectangular projection 55 extends forwardly from the rear of the moulding. Slightly below this projection 55 and to the right thereof as viewed in FIGS. 3 to 6, is a rack guide peg 56 also formed on the rear body moulding.

Reciprocally carried at the rear of and beneath the platform 21 is a rack moulding 57 which is formed as an elongated rectangular member, its longer sides lying generally parallel with the lower longer side of the front body moulding. The rack moulding is effectively divided approximately mid-way along its length into a guide part at the left as shown in the drawings, and a rack part at the right thereof.

This guide part is in the form of an elongated rectangular slot 58 parallel to the sides of the moulding in which is fitted the lug 53 on the front body moulding, this lug 53 serving to guide the rack moulding as it reciprocates in use, as will be described, the lug allowing a limited amount of tilting of the rack moulding as can be seen from FIGS. 3 to 6.

As previously described, the driving arm 32 passes through the slot 29 in the blade carrier guideway, and this arm also passes through a corresponding slot 59 in the platform 21. In this way the opening 33 is disposed at the position of the lower part of the slot 58 and a driving lug 60 on the rack moulding just below the slot 58 is received in this opening 33 so as to connect the rack moulding to the blade carrier. The driving lug 60 is a tight fit in the opening 33 so that reciprocal movement of rack moulding is directly transmitted to the blade carrier which is thus also reciprocally moved, in use, from side to side across the front of the grinding wheel as the driving arm 32 moves backwards and forwards along the slots 29 and 59.

The rack part of the rack moulding is in the form of parallel, spaced upper and lower racks 61, 62, respectively, each rack having gear teeth of a complementary form to the gear teeth on the pinion 44. The disposition of the rack moulding as governed by the lug 53, is such that the pinion normally engages with either the upper rack or the lower rack depending upon the degree of tilt, previously mentioned, permitted by the engagement of the lug 53 with the slot 58.

Approximately at the junction of the guide and rack parts of the rack moulding, the rack moulding is provided on its upper face with a lug 63.

Also extending from this junction along the whole of rack part to the end of the rack moulding from the upper surface of the rack moulding is a further guide part 64 which is in the form of a rectangular slot 65 divided into upper and lower slots 65a, 65b, respectively, by a central rib 66, the opposite ends of the rib being terminated clear of the ends of the slot 65 so as to leave clearance for the rack guide peg 56 which is received in the slot 65 and can travel in both the upper and lower slots as a relatively close fit, as a result of its width substantially matching the width of each of the upper and lower slots.

Figure 3:
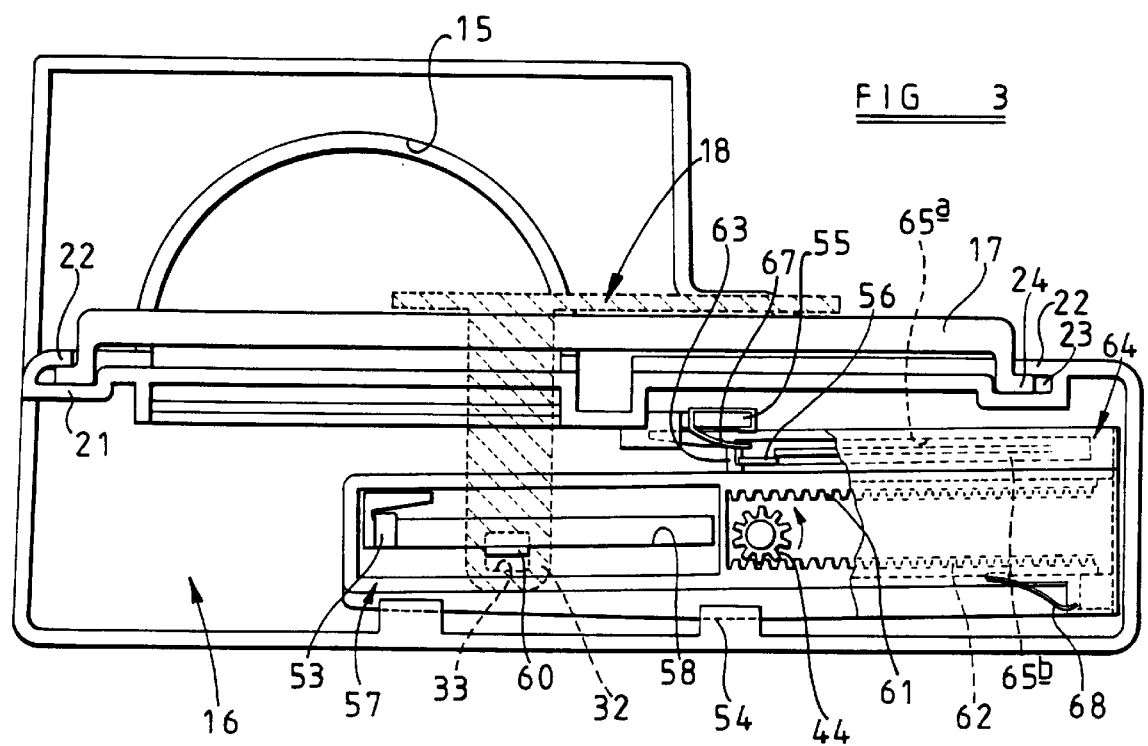

The rectangular projection 55 carries a blade spring 67 which generally projects downwardly therefrom and is compressed upwardly by the rack lug 63 when the rack moulding is of the extreme right hand end of its travel as shown in FIG. 3. Thus upon reaching this state, the rack moulding will normally be tilted about the lug 53 into a lower position where the rack guide peg 56 moves from the level of the lower slot 65b to the level of the upper slot 65a and the drive pinion 44 moves substantially instantaneously out of engagement with the lower rack 62 into engagement with the upper rack 61.

As can be seen from FIGS. 3 to 6, a further blade spring 68 is connected to the rack moulding at the bottom thereof at a posit ion adjacent the right hand end thereof, as viewed in the Figures. Whereas the purpose of the blade spring 67 is to tilt the rack moulding downwardly at its extreme right hand end of travel, the further blade spring 68 operates to tilt the rack moulding upwardly when it reaches its extreme left hand end of travel, as shown in FIG. 5, by engaging on the lug 54 and initially being compressed before lifting the rack moulding once the rack guide peg 56 has reached the right hand end of the upper slot 65a. As described, at these opposite extreme positions the springs operate to tilt the rack moulding upwardly or downwardly, and as a result, since the rack guide peg 56 is at respective opposite ends of the slot 65 in these extreme positions of movement of the rack moulding, the rack guide peg 56 is re-positioned at the level of the upper or lower slots 65a, 65b, opposite to that which it has just travelled along. In this way the rack moulding is then held in its upwardly or downwardly tilted position as the pinion then rotates and moves the rack moulding, as the rack guide peg 56 is then held in either the upper or lower slot at one side or the other of the rib 66.

Thus looking in detail at FIGS. 3 to 6, it will be appreciated that in FIG. 3 the rack moulding has been moved to the right by virtue of the engagement of the teeth of the pinion 44 with the teeth of the lower rack 62, the pinion rotating in anti-clockwise direction as shown by the arrow adjacent it. During this movement of the rack moulding to the right, the rack guide peg 56 has travelled to the left, relative to the rack moulding, along the lower slot 65b with the rack moulding tilted upwardly. Just before the rack moulding reaches its extreme right hand position, the rack lug 63 engages the blade spring 67 and begins to compress it. However once the rack guide peg 56 has reached the extreme left hand end of the lower slot 65b, and is thus now in the area of clearance, the spring acts on the rack lug 63 to force the rack moulding to tilt downwardly so that with the rack guide peg 56 being stationary, the upper slot 65a is effectively moved downwardly so that the rack guide peg 56 is then now at the level of the upper slot 65a. As a consequent the teeth of the pinion now engaged with the upper rack 62 so that as the pinion continues to be rotated in the same direction as before, the rack moulding is now moved to the left with the rack moulding being retained in this downwardly tilted position by the engagement of the rack guide peg 56 in the upper slot which is moving to the left. FIG. 4 shows a position reached approximately half way along the movement of the rack moulding to the left. As will be apparent from the previous description, the movement of the rack moulding, and thus the driving lug 60 transmits the drive to the carrier driving arm and thus the carrier itself which also moves to the left across the carrier guideway.

Just before the rack moulding reaches its extreme left hand position shown in FIG. 5, the further blade spring 68 engages the lug 54 and is initially compressed. However as soon as the full left hand movement of the rack moulding occurs the rack guide peg is positioned at the end of the upper slot 65a, and thus again in the area of clearance. Accordingly the upward force on the rack moulding effected by the spring 68 causes the rack moulding to tilt upwardly repositioning the rack guide peg 56 at the level of the lower slot 65b and bringing the pinion to engagement into engagement with the lower rack 62. Thus the continued rotation in the same direction of the pinion now drives the rack moulding to the right, with the rack moulding being held in its upwardly tilted position by the engagement of the rack guide peg in the lower slot 65b. FIG. 6 shows this movement to the right approximately half way there along. The action is then repeated when the rack moulding again reaches its right limit of movement so that the position of FIG. 3 is then repeated and so on. It will thus be seen that automatic reciprocation of the carrier is effected as long as the pinion is driven and a blade carried by the vice jaw assembly can be sharpened by this movement to and fro across the grinding wheel, with any adjustments being made, as grinding proceeds, by way of the adjustment screw 26 or the adjustment knob 39.

It will be appreciated that the reciprocatory drive arrangement shown in FIGS. 3 to 6 is only one embodiment of the present invention, in that various other arrangements are possible, including arrangements where there is in effect a continuous rack, i.e. the racks are not discontinued at the extreme ends of rack moulding movement. A convenient way of effecting such an arrangement is to provide some form of continuous internally toothed belt or similar.

In one alternative arrangement a continuous internally toothed belt is provided, the drive pinion engaging the belt at one end of the belt run, where it is curved and an idler wheel engaging the belt at the other curved end, the two wheels being spaced to keep the belt taut in the form of a conventional pulley. The belt is provided with a peg on its outer surface, this peg thus travelling around the whole of the outside of the belt as the belt is rotated. If this belt is provided within an elongated slot in a drive arm, it is possible to arrange for the drive arm to have adjacent and complementary notches of opposite hand respectively for engagement by the peg so that as the peg moves across the upper run of the belt it will engage in the notch to push the arm in one direction, the peg then leaving the notch at one end of drive arm movement and continuing around a curved path of the belt at the drive or idler wheel. The peg then engages in the other notch of the drive arm, this being of an opposite hand so as to force the drive arm in the opposite direction as the peg travels along the lower run of the belt. When the opposite extreme end position of travel of the drive arm is reached, the peg disengages from the lower notch of the drive arm, the drive arm then remaining stationary until the peg again engages in the notch in the upper part of the drive arm once again to move it in the opposite direction. Instead of two separate notches, some form of continuous lateral slot across the drive arm could also be used, as could suitable abutments instead of slots.

In a further alternative arrangement the drive arm itself could be provided with a continuous internally toothed slot, equivalent to the above mentioned belt, the drive gear engaging these teeth and there being a peg in the centre of the drive gear to ensure that the drive gear meshes with the continuous teeth as the arm is driven upon rotation of the drive gear. The gear peg can be received in a curved ended elongated groove disposed substantially centrally of the toothed slot so that with this arrangement there is continuous engagement of the pinion teeth with the teeth of the slot, the drive gear being slightly moved where necessary to ensure that even though slightly undersized it always engages with the same amount of teeth at the curved ends of the slot in moving from engagement with the upper part of the continuous toothed slot to the lower part thereof to drive the arm in opposite directions. Although both alternative arrangements are believed viable, the embodiment shown in FIGS. 3 to 6 is preferred in that with the first alternative embodiment described there is a slight problem with the delay while the peg moves around the curved end of the toothed belt, and with the second alternative embodiment described there could be a slight problem with the extra torque at the curved ends of the continuously internally toothed slot. The embodiment of FIGS. 3 to 6 is particularly effective in its use of the two blade springs which effect the necessary upward or downward tilting of the rack moulding almost instantaneously to switch engagement of the pinion from one rack to the other and thus to reverse the drive.

I claim:

1. Means for producing relative reciprocatory movement between two members, comprising:
    rotary drive means associated with a first of said members, the second of the members being drivable through engagement means for receiving drive from said rotary drive means;
    a first part of the engagement means being such that when the first part of the engagement means receives said drive the first part of the engagement means causes the second member to move in one direction;
    a second part of the engagement means being such that when the second part of the engagement means receives the drive the second part of the engagement means causes the second member to move in the opposite direction; and
    resilient means, having first and second resilient portions for effecting automatically the change in the reception of drive from said first part of the engagement means to the second part thereof, respectively, in use, and the direction of rotation of the drive means being the same when transmitting drive to either of said first part or said second part of the engagement means, where said engagement means moves to receive said drive from said rotary drive means for either said first part or said second part.

2. Means as claimed in claim 1, wherein the engagement means comprises two parallel, spaced, facing racks, the two racks constituting said first part and said second part respectively of the engagement means.

3. Means as claimed in claim 2, wherein the resilient means comprises two springs which effect said automatic change when the drive means is at opposite ends of the racks respectively.

4. Means as claimed in claim 3, wherein when the drive means is engaged with a rack at a position between the ends thereof, the engagement of the rack is maintained by means of part of said first member traveling in either an upper or a lower part of a guide slot associated with the engagement means.

5. Means as claimed in claim 4, wherein the automatic transfer of drive from one rack to the other is effected by the springs effecting relative movement between said part of said first member and said guide slot, at the end of the rack, so that the part can alternately be received in the upper and lower parts of the guide slot, thereby maintaining either the upper rack or the lower rack in engagement with the drive means.

6. Means as claimed in claim 2, wherein said engagement means are on a reciprocatory member to which said second member is connected for driving movement therewith, in use.

7. Means as claimed in claim 6, wherein said reciprocatory member has a lug and said first member has a guiding slot, where said lug is received in said guiding slot to guide movement of the reciprocatory member, in use.

8. Means as claimed in claim 7, wherein the lug is arranged in said guiding slot so as to allow tilting adjustment of the reciprocatory member, in use.

9. Means as claimed in claim 1, wherein said second member is a carrier which mounts a vice for clamping, in use, a blade.

10. Means as claimed in claim 9, wherein the vice includes a vice jaw assembly in which a pair of jaws are adjustably movable towards or away from each other to clamp said blade, in use.

11. Means as claimed in claim 9, wherein the vice is mounted on the carrier for relative tiltable adjustment.

12. Means as claimed in claim 9, wherein said second member is carried on a guideway which is adjustably slidable in a direction transverse to the direction of reciprocatory movement of said second member.

13. Means as claimed in claim 12, wherein said guideway is adjustably slidably mounted on a platform of a member housing a drivable grinding wheel for sharpening said blade, in use.

14. Means as claimed in claim 12, wherein said guideway is adjustably slidably mounted on a platform of an adapter releasably engageable, in use, with a drivable grinding wheel for sharpening said blade, in use.

15. Means as claimed in claim 13, wherein the grinding wheel is carried on a drive shaft from which drive is taken, in use, to said rotary drive means by means of a gear train arrangement.

16. Means as claimed in claim 6, wherein said reciprocatory member has a guiding slot and said first member has a lug received in said guiding slot to guide movement of the reciprocatory member, in use.

17. Means as claimed in claim 16, wherein the lug is arranged in said guiding slot so as to allow tilting adjustment of the reciprocatory member, in use.

* * * * *